United States Patent
Schulz

(10) Patent No.: US 10,683,859 B2
(45) Date of Patent: Jun. 16, 2020

(54) POPPET VALVE

(71) Applicant: BURCKHARDT COMPRESSION AG, Winterthur (CH)

(72) Inventor: Reiner Schulz, Lottstetten (DE)

(73) Assignee: BURCKHARDT COMPRESSION AG, Winterthur (CH)

( * ) Notice: Subject to any disclaimer, the term of this patent is extended or adjusted under 35 U.S.C. 154(b) by 0 days.

(21) Appl. No.: 16/466,932

(22) PCT Filed: Nov. 29, 2017

(86) PCT No.: PCT/EP2017/080773
§ 371 (c)(1),
(2) Date: Jun. 5, 2019

(87) PCT Pub. No.: WO2018/104122
PCT Pub. Date: Jun. 14, 2018

(65) Prior Publication Data
US 2020/0063729 A1     Feb. 27, 2020

(30) Foreign Application Priority Data

Dec. 5, 2016   (EP) .................................... 16202189

(51) Int. Cl.
*F16K 15/00* (2006.01)
*F04B 39/10* (2006.01)
*F16K 15/06* (2006.01)

(52) U.S. Cl.
CPC ........ *F04B 39/1013* (2013.01); *F16K 15/066* (2013.01)

(58) Field of Classification Search
CPC ........ F16K 15/066; F16K 15/10; F16K 15/12; F04B 39/1013

USPC ....... 137/535, 512.5, 516.15, 516.11, 516.27
See application file for complete search history.

(56) References Cited

U.S. PATENT DOCUMENTS 8,240,330 B2 * 8/2012 Moore ................ F04B 39/1033
                                                             137/512
2010/0090149 A1   4/2010 Thompson et al.

FOREIGN PATENT DOCUMENTS

DE    202014105513 U1   2/2015
EP        2703647 B1   10/2017

OTHER PUBLICATIONS

International Search Report for PCT/EP2017/080773, Prepared by the European Patent Office, dated Apr. 5, 2018, 4 pages.

* cited by examiner

Primary Examiner — P. Macade Nichols
(74) Attorney, Agent, or Firm — Brooks Kushman P.C.

(57) ABSTRACT

A poppet valve including a valve seat cover having a plurality of inlet channels, wherein each inlet channel opens into a valve seat, and includes a plurality of closing elements, which are movable in an axial direction (A), wherein a closing element, which is movable in an axial direction (A), is associated with each valve seat in order to close the valve seat, wherein all closing elements are arranged on a common closing element holding device and the closing element holding device is movable in the axial direction (A) such that the closing elements can assume at least two positions, an open position, in which the closing elements are raised relative to the valve seats, and a closed position, in which the closing elements rest against the valve seats.

15 Claims, 7 Drawing Sheets

POPPET VALVE

CROSS-REFERENCE TO RELATED APPLICATION

This application is the U.S. national phase of PCT Application No. PCT/EP2017/080773 filed on Nov. 29, 2017, which claims priority to EP Patent Application No. 16202189.3 filed on Dec. 5, 2016, the disclosures of which are incorporated in their entirety by reference herein.

DESCRIPTION

The invention relates to a poppet valve in accordance with the preamble of claim 1.

PRIOR ART

Document US2010/0090149A1 discloses a poppet valve for a piston compressor. This poppet valve exhibits relatively high wear. Moreover, this poppet valve has relatively high pressure losses, furthermore requires a relatively large installation height and, in addition, is still relatively sluggish.

DESCRIPTION OF THE INVENTION

It is the object of the invention to embody a poppet valve which has more advantageous operating characteristics.

This object is achieved by means of a poppet valve having the features of claim 1. Dependent claims 2 to 15 relate to further advantageous embodiments of the invention.

In particular, the object is achieved by a poppet valve comprising a valve seat cover having a plurality of inlet channels, wherein each inlet channel opens into a valve seat, and comprising a plurality of closing elements, which are movable in an axial direction, wherein a closing element is associated with each valve seat, and wherein each valve seat is arranged opposite the associated closing element in the axial direction, such that each valve seat is closable by the associated closing element, wherein all the closing elements are arranged on a common closing element holding device, and wherein the closing element holding device is movable in the axial direction in such a way that the closing elements can assume at least two positions, an open position, in which the closing elements are raised relative to the valve seats, and a closed position, in which the closing elements rest against the valve seats.

The poppet valve according to the invention comprises a valve seat cover having a plurality of inlet channels, wherein each inlet channel opens into a valve seat, and comprises a closing element holding device, on which a plurality of closing elements is arranged, wherein a separate closing element is associated with each valve seat. The closing element holding device is preferably of one-piece configuration, with the result that the closing elements connected to the closing element holding device are arranged in such a way as to be movable jointly in an axial direction relative to the valve seat cover, wherein the closing elements are arranged relative to the valve seats in such a way that each valve seat can be opened and closed by one closing element. In another possible embodiment, the closing element holding device consists of at least two separate closing element holding device parts, wherein all the closing elements are connected, preferably in a fixed manner, to the closing element holding device. In this embodiment, the closing element holding device parts are movable independently of one another in the axial direction, in accordance with the movement of the respective closing element holding device part.

In a preferred embodiment, the closing element holding device is embodied as a flat support which is fluid-permeable or allows through flow, comprising interspaces for the passage of the fluid flowing through the inlet channels, and comprising fastening points for fastening the closing elements. The closing element holding device is embodied as a perforated, screen- or braid-type support structure, for example. The closing element holding device or support comprises a plurality of fastening points for fastening the closing elements, wherein the fastening points are connected to one another by the perforated or screen-type or braid-type structure, for example. As a particular preference, the closing element holding device is embodied as a two-dimensional grid structure and preferably has a multiplicity of struts and nodes, wherein the struts connect the nodes to one another, wherein one closing element is preferably fastened on each of the nodes, and wherein the closing element holding device has a multiplicity of interspaces between the struts and nodes. A poppet valve comprising the two-dimensional grid structure has the advantage that the overall height of the closing element holding device and the closing element is relatively small, with the result that the poppet valve according to the invention has a small dead space. The grid structure with interspaces has the advantage that the fluid flowing through the poppet valve is deflected only slightly after emerging from the valve seat, with the result that the poppet valve according to the invention has a low flow resistance. The closing elements are advantageously flexibly connected to or mounted on the closing element holding device, allowing the closing element to move slightly relative to the closing element holding device in a linear and/or rotary motion, in particular to compensate manufacturing tolerances or wear of the closing elements.

In an advantageous embodiment of the poppet valve according to the invention, the closing elements are arranged in mutual symmetry on the closing element holding device, e.g. in point symmetry in relation to a center line A. This symmetrical arrangement has the advantage that forces acting laterally on the closing elements cancel each other out, as a result of which there is less stress on the positioning of the closing element holding device relative to the valve seat, i.e. on the guide, and, for example, can also be accomplished in a frictionless manner by spring links or helical springs. In an advantageous embodiment, the elasticity of the closing element holding device and/or the elasticity of the connection point between the closing element holding device and the closing element are sufficient to compensate tolerances.

The closing element holding device is advantageously arranged in a sprung manner relative to the valve seat cover, e.g. with correspondingly designed spring links or by helical springs. These springs can also be mounted in the valve seat, in the case of helical springs in corresponding holes, for example, and, in the case of leaf springs, in an annular space on the outside of the valve seat, for example.

In an advantageous embodiment, the closing elements are manufactured from a plastic. This has the advantage that the overall weight of the moving parts comprising, in particular, the closing element holding device and the closing elements is relatively small, and the moving parts thus have a low inertia, with the result that lower forces occur during the operation of the poppet valve according to the invention, reducing wear. This is advantageous particularly for poppet valves, which are operated at a relatively high speed, e.g.

with 30 closing cycles per second. The closing elements could also be manufactured from a metal or from a combination of metal and plastic. A closing element consisting of a combination of metal and plastic has the advantage that the parts which come into contact with the valve seat can be manufactured from plastic and therefore cause less abrasion on the valve seat, and that the metal performs a supporting function in order to keep the plastic in an advantageous position.

The poppet valve according to the invention can be serviced at low cost by replacing only those closing elements which are worn, whereas the remaining closing elements can continue to be used. The poppet valve according to the invention can also be serviced very quickly by jointly replacing the closing element holding device and all the closing elements fastened thereon with an arrangement which is as good as new. Since the closing element holding device and the closing elements fastened thereon can be produced at very low cost, it is also inexpensive to replace the entire arrangement comprising the closing element holding device and the closing elements fastened thereon as a whole. Moreover, the removal and replacement of the arrangement in the poppet valve according to the invention can be accomplished very quickly and inexpensively. This is also advantageous particularly when the fluid delivered contains contaminants, resulting in increased wear of the closing elements.

Known poppet valves have a small number of closing elements. The poppet valve according to the invention has the advantage that the closing element holding device can be embodied in a simple manner in such a way that a multiplicity of closing elements can be fastened thereon, e.g. 15, 20, 30 or 40 closing elements, by correspondingly reducing the maximum outside diameter of the closing elements and arranging the nodes in a corresponding manner on the closing element holding device. As compared with conventional poppet valves, the valve seat cover of this embodiment has a higher number of inlet channels, with the result that the total passage area is divided between a larger number of channels, resulting in the advantage that the valve seat cover has a higher strength and/or resulting in the advantage that a smaller stroke of the closing elements is required to open and close the channels by virtue of the smaller diameter. This smaller stroke results, in particular, in the advantage that the closing elements can be operated with a higher number of cycles per second. The closing elements preferably have a significantly larger diameter than the connecting parts which connect each closing element to the closing element holding device. This embodiment has the advantage that the connecting part affects the flow cross-section of each valve seat or of the associated closing element to only a negligibly small extent or, preferably, not at all. The poppet valve according to the invention thus has a lower flow resistance.

As compared with conventional poppet valves, the poppet valve according to the invention in an advantageous embodiment has the advantage that, for a given overall installation height, said valve can be used for higher pressures since the closing element holding device and the closing elements fastened thereon require a smaller installation height, thus enabling the valve seat cover to be made correspondingly thicker and, as a result, more pressure resistant.

The invention is described in detail below by means of embodiment examples.

BRIEF DESCRIPTION OF THE DRAWINGS

In the drawings used to illustrate the embodiment examples.

In the drawings, identical parts are fundamentally provided with identical reference signs.

EMBODIMENTS OF THE INVENTION

Figure 1:
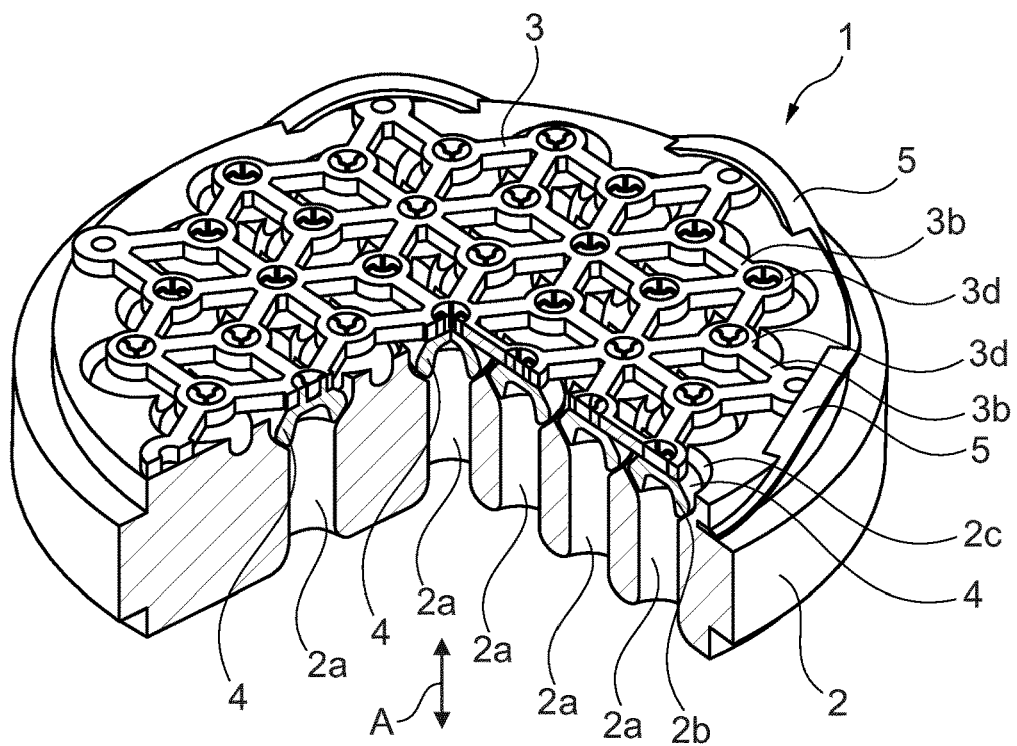
FIG. 1 shows a first embodiment example of a poppet valve, partially in section.

FIG. 1 shows a first embodiment example of a poppet valve 1, partially in section. The valve seat cover 2 comprises a plurality of inlet channels 2a, which extend in an axial direction A and which open into a valve seat 2b and subsequently into an outlet channel 2c. The poppet valve 1 comprises a closing element holding device 3, which is embodied as a grid structure comprising struts 3b and nodes 3d. The poppet valve 1 furthermore comprises a plurality of closing elements 4, wherein one closing element 4 is fastened on each node 3d. The closing element holding device 3 and the closing elements 4 fastened thereon can be moved jointly in the axial direction A, wherein the poppet valve 1 comprises a spring 5, which limits the stroke travel of the closing element holding device 3 and produces a restoring force. The spring 5 and the fastening of the spring 5 on the valve seat cover 2 can be embodied in different ways and, in the embodiment example illustrated, is embodied as a spring 5 which extends in the circumferential direction of the valve seat cover 2 and, on the one hand, is connected to the valve seat cover 2 and, on the other hand, rests against the closing element holding device 3. In a preferred embodiment, a larger space is provided in the valve seat cover 2 for the spring 5 than is illustrated in FIG. 1 in order to arrange the spring 5 in an advantageous way relative to the valve seat cover 2. Moreover, the connection between the spring 5 and the closing element holding device 3 can be embodied in a large number of different ways.

Figure 2:
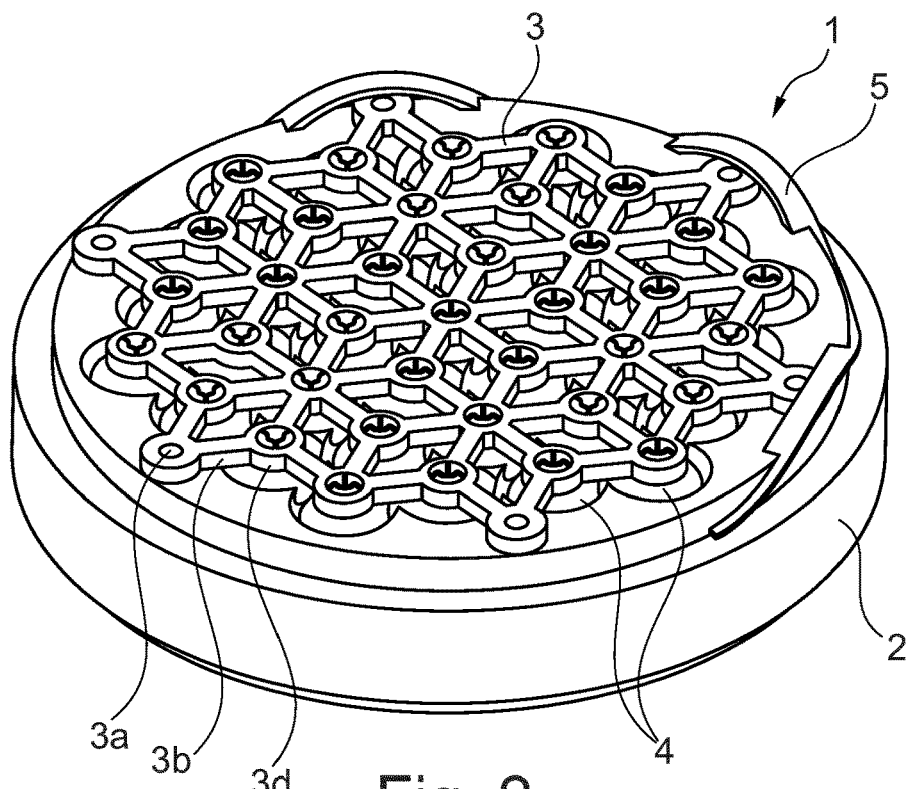
FIG. 2 shows the poppet valve shown in FIG. 1.

FIG. 2 shows the poppet valve 1 according to FIG. 1 without the sectioned view.

Figure 3:
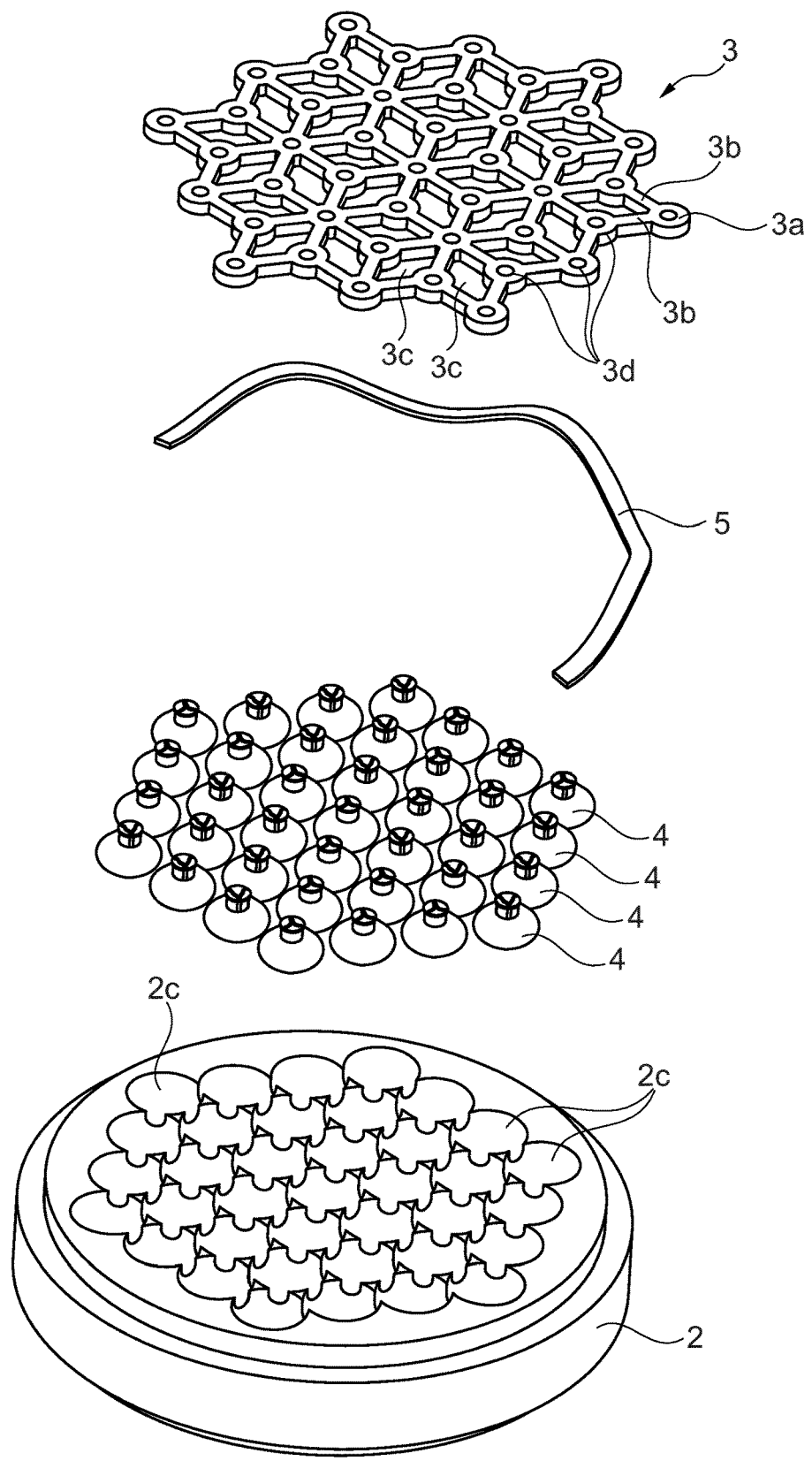
FIG. 3 shows an exploded drawing of the poppet valve shown in FIG. 1.

FIG. 3 shows the poppet valve 1 according to FIG. 1 in an exploded view. The poppet valve 1 comprises the valve seat cover 2 having a plurality of outlet channels 2c, wherein the valve seats 2b and inlet channels 2a connected thereto are not illustrated or not visible. The embodiment example illustrated comprises thirty seven outlet channels 2c, wherein one closing element 4 is associated with each outlet channel 2c, and therefore the poppet valve illustrated comprises thirty seven closing elements 4. The poppet valve 1 furthermore comprises a grid-shaped closing element holding device 3, wherein the nodes 3d are arranged in such a way that the closing elements 4 fastened thereon each come to lie opposite the corresponding valve seat 2d. The poppet valve 1 furthermore comprises an undulating spring 5.

Figure 4:
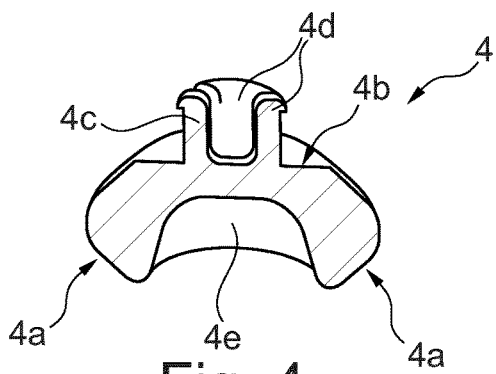
FIG. 4 shows a closing element in section.

FIG. 4 shows a closing element 4 of the poppet valve shown in FIG. 1, in section. The closing element 4 illustrated is manufactured from a plastic, e.g. PTFE (polytetrafluoroethylene), POM (polyoxymethylene), PEEK (polyether ether ketone). The closing element 4 comprises a closing head 4a or a contact surface, which is intended to rest on the valve seat. The closing element 4 furthermore comprises a supporting surface 4b for resting against the closing element holding device 3. The closing element 4 furthermore comprises a fastening means 4c, in the embodiment example illustrated embodied as a clip comprising three spring arms 4d. The closing element 4 can furthermore comprise a recess 4e, which makes it possible to reduce the overall weight of the closing element 4. The closing element 4 illustrated could also be manufactured from metal, e.g. copper, steel or light metal alloys.

Figure 5:
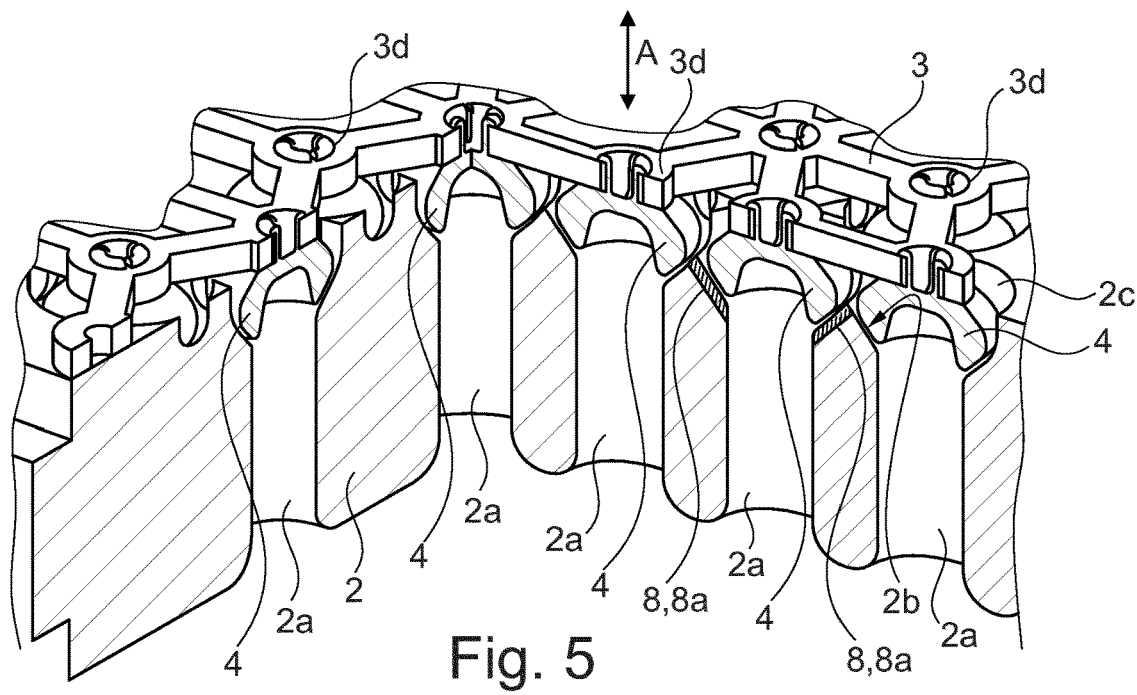
FIG. 5 shows a detail view of the poppet valve shown in FIG. 1.

FIG. 5 shows the section illustrated in FIG. 1 in detail. FIG. 5 shows indicatively yet another embodiment example by illustrating a damping element 8a on a valve 2b. Particularly if the closing elements 4 are manufactured from metal, a damping element 8a proves advantageous, wherein the damping element 8a is advantageously interchangeable and is advantageously embodied as an interchangeable valve seat, wherein the damping element 8a preferably consists of a plastic. In an advantageous embodiment, each valve seat 2a could comprise a separate damping element 8a. In another advantageous embodiment, all the damping elements 8a could be formed by a common seat plate 8, wherein the seat plate 8 can preferably be laid on the valve seat cover 2, and a damping element 8a is formed on each valve seat 2a. This seat plate 8 is preferably interchangeable and preferably consists of a plastic. The common seat plate 8 or the individual damping elements 8a could also be embodied as hardened seats and could be manufactured from a metal, for example. Such hardened seats are advantageous particularly in combination with closing elements comprising or consisting of plastic.

Figure 6:
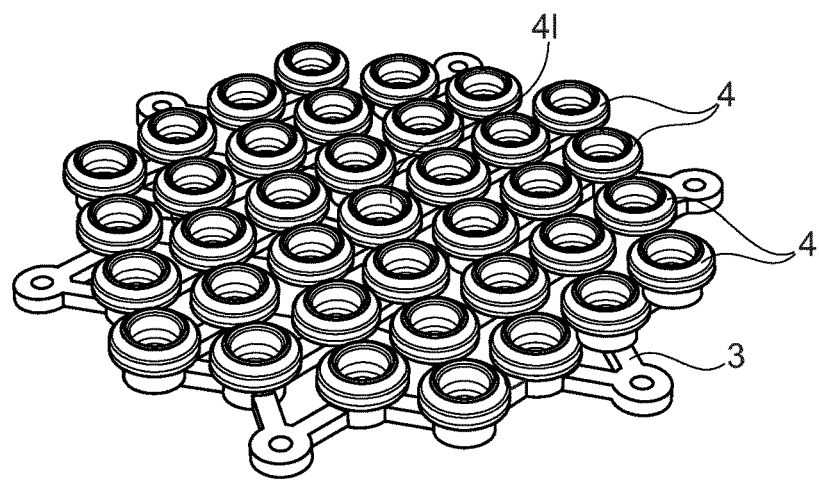
FIG. 6 shows an arrangement of the closing elements.

FIG. 6 shows the moving parts of the poppet valve 1 illustrated in FIG. 1, namely the closing element holding device 3 and the closing elements 4 fastened thereon. All the closing elements 4 are arranged symmetrically with respect to the central closing element 4l. This symmetrical arrangement has the advantage that the sum of all the forces acting laterally on the closing elements 4, in particular the forces acting perpendicularly to the direction of movement A, balance each other out or compensate each other substantially and, preferably, completely. This has the advantage that the forces acting on the springs 5 in the direction perpendicular to the direction of movement A are small, with the result that these forces exert only a slight wearing effect or none at all on the springs 5.

It is furthermore apparent from FIG. 6 that the poppet valve 1 according to the invention is very easy to service. Individual damaged closing elements 4 can be separated in a simple manner from the closing element holding device 3 and replaced by a new closing element 4 by fastening the new closing element 4 on the corresponding node 3d by means of the clip joint 4d. Moreover, it is a simple matter to replace the entire closing element holding device 3 with all the closing elements 4 fastened thereon as a whole. Such servicing can be carried out at very low cost, especially also because the closing element holding device 3 is easily accessible.

Figure 7:
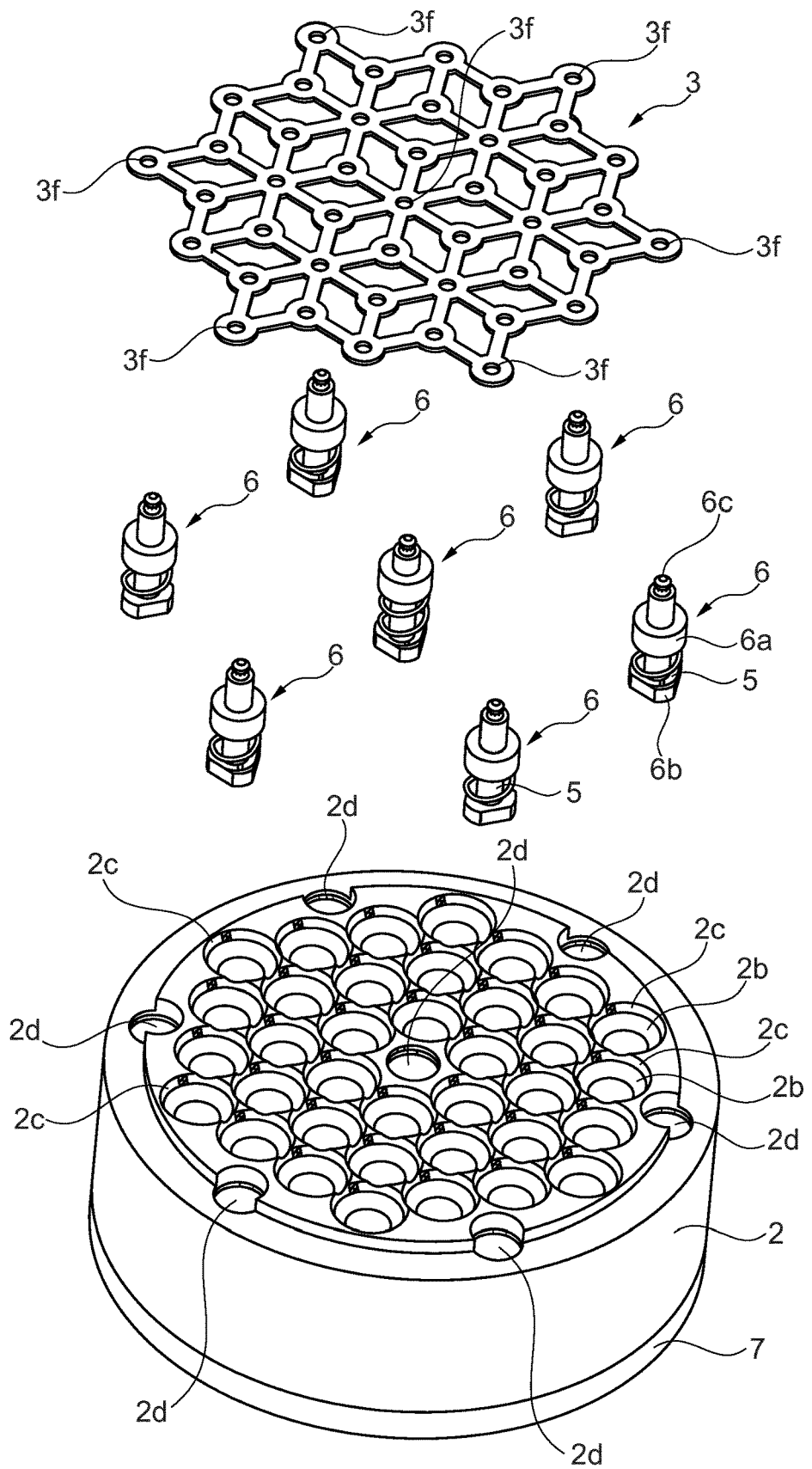
FIG. 7 shows an exploded drawing of a second embodiment example of a poppet valve.
Figure 9:
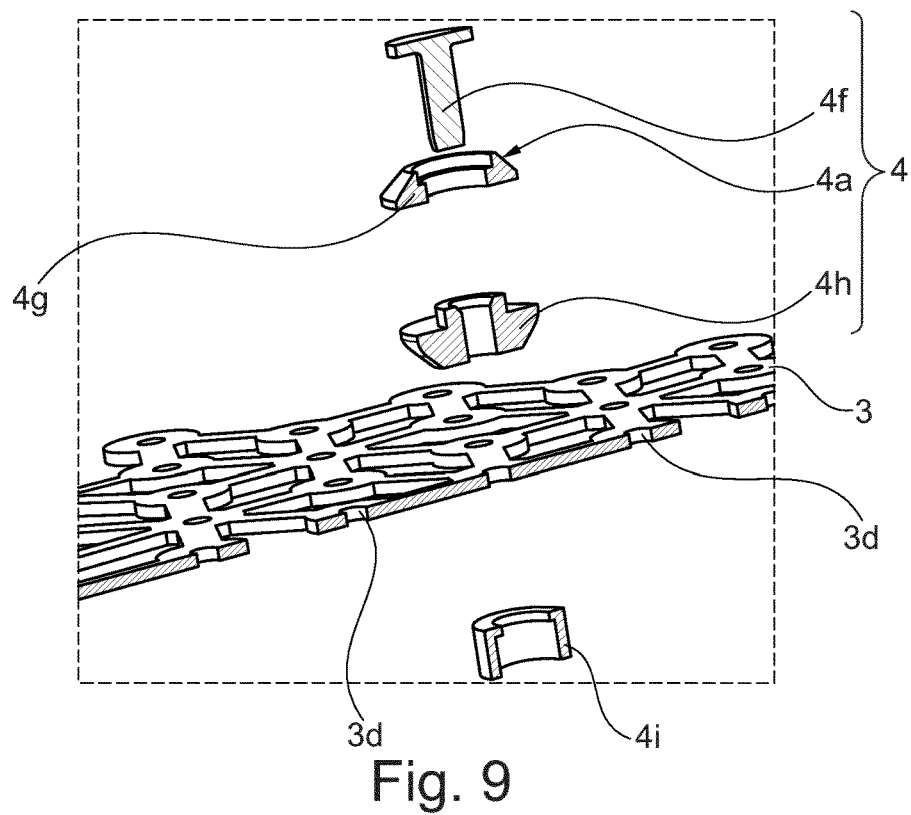
FIG. 9 shows another embodiment example of a closing element.

FIG. 7 shows, in an exploded drawing, a second embodiment example of a poppet valve 1, wherein the closing elements 4 are not illustrated. The closing element holding device 3 is of identical configuration to that in the first embodiment example, this being apparent especially from FIG. 3. The closing elements 4 could be the same as those illustrated in FIG. 3, with the exception that no closing element 4 is fastened in the center of the closing element holding device 3 shown in FIG. 7. The valve seat cover 2 comprises a plurality of inlet channels 2a (not visible), which each open into the valve seat 2b and the corresponding outlet channel 2c. The valve seat cover 2 comprises six blind holes 2d arranged spaced apart along the circumference and furthermore comprises a blind hole 2d arranged in the center. A guide part 6 is arranged in each of these blind holes 2d. Each guide part 6 is connected to the closing element holding device 3 and ensures the movement of the closing element holding device 3 in the axial direction A relative to the valve seat cover 2. The guide part 6 comprises a fastening part 6a, which is fastened in the blind hole 2d, and comprises an end part 6b, which is connected in a fixed manner to a longitudinal stem 6c. A spring 5 is arranged between the fastening part 6a and the end part 6b. The end part 6b is arranged in the blind hole 2d in such a way as to be movable in the axial direction A, and the upper end section of the longitudinal stem 6c is connected to the closing element holding device 3 by means of the fastening parts 3f, thus ensuring, on the one hand, that the guide part 6 is arranged in a fixed manner in the valve seat cover 2 and the longitudinal stem 6c and the closing element holding device 3 connected thereto are supported in such a way as to be movable in the axial direction A. This embodiment has the advantage that the closing element holding device 3 is guided in a precise manner in the axial direction A. In one possible embodiment, the closing elements 4 are embodied as illustrated in FIG. 4. It is advantageous if the closing elements 4 are embodied as illustrated in FIG. 9. The guide parts 6 can be embodied in a large number of possible ways in order to ensure guidance of the closing element holding device 3 in the axial direction A.

Figure 8:
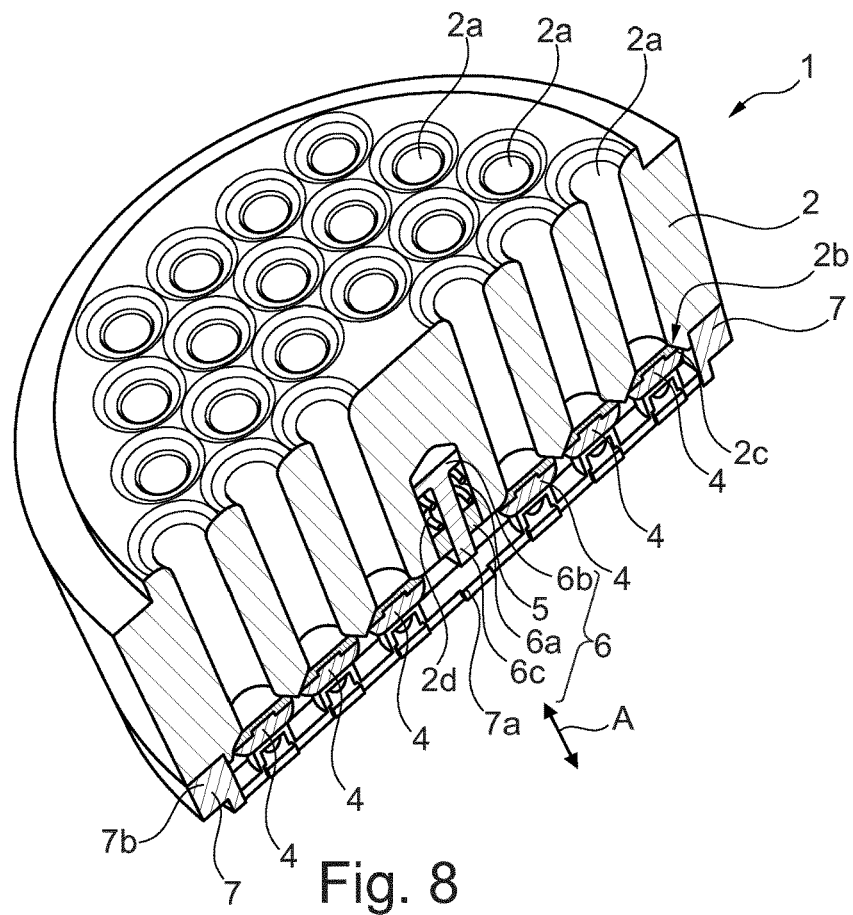
FIG. 8 shows a longitudinal section through the poppet valve shown in FIG. 7.

FIG. 8 shows a longitudinal section through the poppet valve 1 shown in FIG. 7, using the closing element 4 illustrated in FIG. 9. The longitudinal section according to FIG. 8 shows a plurality of inlet channels 2a, wherein each inlet channel 2a opens into a valve seat 2b and then into an outlet channel 2c. Illustrated in the center of the valve seat cover 2 is the blind hole 2d, in which the guide part 6 is arranged in order to guide the closing element holding device 3 movably in the axial direction A and in order to bring about, by means of the spring 5, a preloading force or restoring force directed toward the valve seat cover 2 on the closing element holding device 3. In one advantageous embodiment, the poppet valve 1 furthermore comprises a catcher 7, which advantageously comprises a fastening part 7b extending in the circumferential direction, which is connected to the valve seat cover 2 and furthermore advantageously has a flat grid structure 7a with openings. The catcher 7 serves to limit the movement of the closing element holding device 3 in the axial direction A. The catcher 7 furthermore advantageously retains freely movable parts, e.g. parts that have broken off, preventing them from leaving the poppet valve 1.

Figure 10:
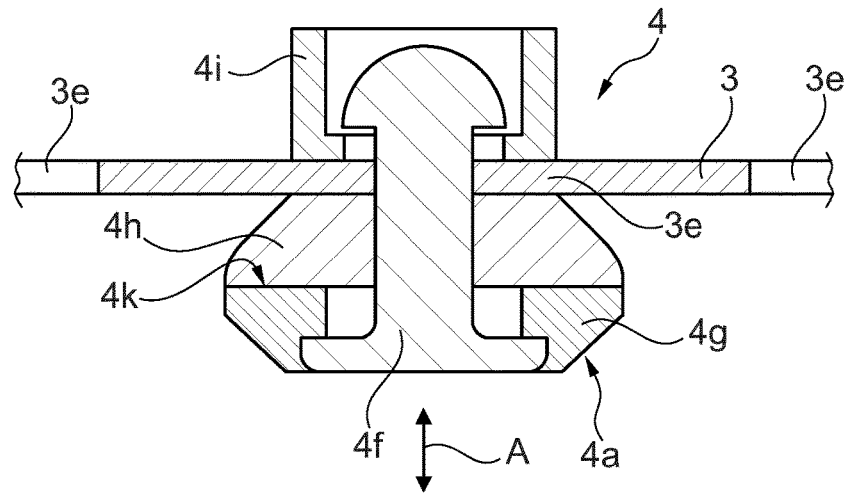
FIG. 10 shows a longitudinal section through the assembled closing element shown in FIG. 9.

FIG. 9 shows an embodiment example of a closing element 4 before assembly, and FIG. 10 shows it after assembly. The closing element 4 comprises at least one closing part 4g, a supporting part 4h and a rivet 4f and furthermore preferably comprises a distance piece 4i. As illustrated in FIG. 9, the rivet 4f is introduced into the closing part 4g and the supporting part 4h, then punched through the opening in a node 3d, and then introduced into the distance piece 4i. After this, the rivet 4f is riveted, with the result that it has the shape illustrated in FIG. 10. In an advantageous embodiment, the closing part 4g and the distance piece 4i consist of a plastic, whereas the supporting part 4h and the rivet 4f consist of a metal. The closing part 4g comprises the closing surface 4a and the supporting surface 4k. The closing element 4 illustrated in FIG. 10 has the advantage that the closing part 4g is subject at the supporting surface 4k to a force acting perpendicularly to the surface of the closing part 4g. The closing part 4g illustrated has a conical closing surface 4a, wherein the closing surface 4a is subject substantially to a force acting perpendicularly to the closing surface 4a. This has the advantage that substantially compressive forces are caused to act on the closing part 4a consisting of plastic, and yet negligibly small or no tensile force acts thereon, with the result that negligibly small or no tensile stresses, which could cause fracture of the closing part 4g, arise in the closing part 4g. This embodiment thus has the advantage that the closing part 4g exhibits little wear.

Figure 11:
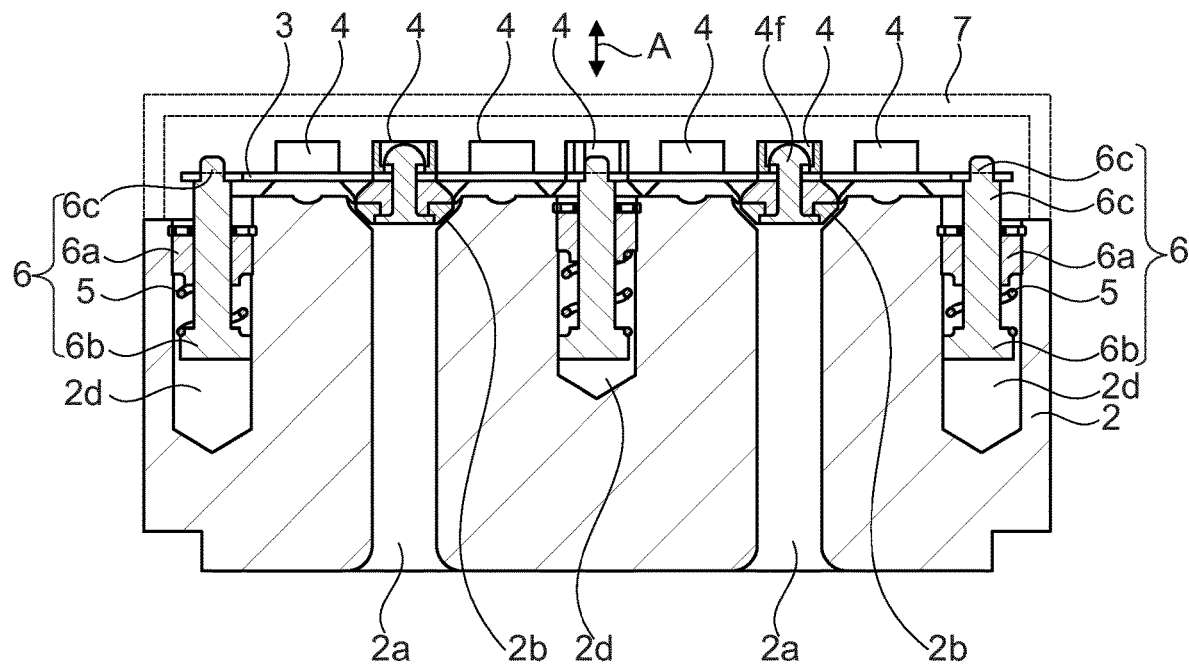
FIG. 11 shows a longitudinal section through the poppet valve shown in FIG. 7.

FIG. 11 shows another longitudinal section through the poppet valve 1 shown in FIG. 7, wherein the catcher 7 is illustrated only indicatively. The closing element holding device 3 and the closing elements 4 connected in a fixed manner thereto are supported in such a way as to be movable in the axial direction of movement A by the guide parts 6 arranged partially in the blind hole 2d. The closing elements 4 are embodied as illustrated in detail in FIG. 10. By means of the movement of the closing elements 4 in the axial direction A, the valve seat 2b is opened or closed in accordance with the position of the closing elements 4. The catcher 7 serves inter alia to limit the maximum possible stroke of the closing elements 4.

Figure 12:
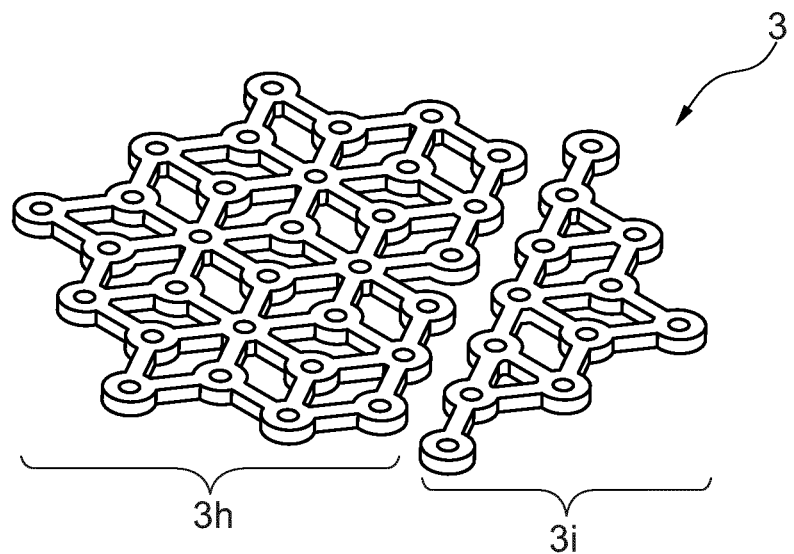
FIGS. 12 and 13 show second further embodiment examples of closing element holding devices.
Figure 13:
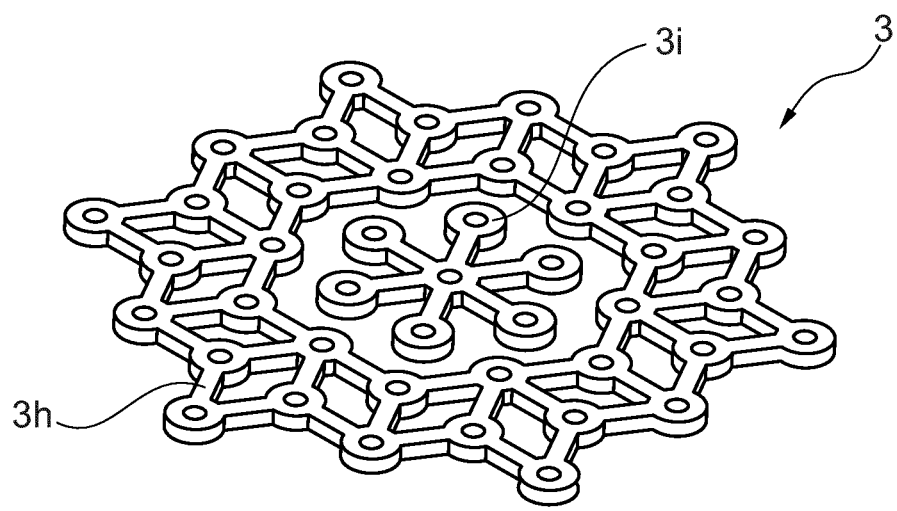

FIGS. 12 and 13 show two further embodiment examples of closing element holding devices 3, wherein, in contrast to the device illustrated in FIG. 3, said devices consist of two parts and comprise a first closing element holding device part 3h and a second closing element holding device part 3i, wherein closing elements 4 can be fastened on both closing element holding device parts 3i, 3h, giving two groups of closing elements 4, wherein each group is connected to a single closing element holding device part 3, 3h. The closing element holding device 3 illustrated in FIG. 12 could likewise be used in the embodiments illustrated in FIGS. 1 to 9. The two parts 3h, 3i of the closing element holding device 3 could be embodied in different ways in order to hold the closing elements 4. Moreover, the closing element holding device 3 could comprise additional parts and could consist of three, four or five parts, for example. A closing element holding device 3 consisting of a plurality of closing element holding device parts 3h, 3i has the advantage that the closing element holding device parts 3h, 3i are individually movable transversely to the longitudinal axis A, thus making it possible to better compensate for any play and/or wear between the closing element 4 and the valve seat 2b.

The invention claimed is:

1. A poppet valve comprising:
a valve seat cover having a plurality of inlet channels, wherein each inlet channel opens into a valve seat, and comprising a plurality of closing elements, which are movable in an axial direction (A), wherein a closing element is associated with each valve seat, and wherein each valve seat is arranged opposite the associated closing element in the axial direction (A), such that each valve seat is closable by the associated closing element, wherein all the closing elements are arranged on a common closing element holding device, and in that the closing element holding device is movable in the axial direction (A) in such a way that the closing elements can assume at least two positions, an open position, in which the closing elements are raised relative to the valve seats, and a closed position, in which the closing elements rest against the valve seats.

2. The poppet valve as claimed in claim 1, wherein the closing element holding device comprises at least two separate closing element holding device parts.

3. The poppet valve as claimed in claim 1, wherein the closing element holding device is of flat and fluid-permeable configuration.

4. The poppet valve as claimed in claim 3, wherein the closing element holding device is embodied as a two-dimensional grid structure, in that the grid structure comprises struts and nodes, and in that the closing elements are arranged on the nodes.

5. The poppet valve as claimed in claim 1, wherein the closing elements are arranged in mutual symmetry on the closing element holding device.

6. The poppet valve as claimed in claim 1, wherein the closing element holding device is supported on the valve seat cover by at least one spring, wherein the spring deflects at least in the axial direction (A).

7. The poppet valve as claimed in claim 1, wherein the closing element holding device is connected to the valve seat cover by at least one guide part movable in the axial direction (A).

8. The poppet valve as claimed in claim 7, wherein the valve seat cover has at least one hole extending in the axial direction (A), and in that a guide part is arranged in each hole.

9. The poppet valve as claimed in claim 1, wherein the closing elements comprises at least partially of plastic.

10. The poppet valve as claimed in claim 9, wherein the closing element is connected to the closing element holding device by a clip joint.

11. The poppet valve as claimed in claim 9, wherein the closing element comprises at least two different materials, a metal and a plastic.

12. The poppet valve as claimed in claim 11, wherein the closing element comprises a closing part, which is arranged in such a way that, when the inlet channel is closed, the closing part rests on the valve seat, and in that the closing part comprises of a plastic.

13. The poppet valve as claimed in claim 12, wherein the closing element comprises a metallic supporting part, in that the supporting part has a supporting surface extending perpendicularly to the axial direction (A), in that the closing part rests on the supporting surface, and in that the closing part is arranged between the supporting surface and the valve seat.

14. The poppet valve as claimed in claim 1, wherein the valve comprises a catcher, and in that the catcher is arranged at such a distance from the closing element holding device in the axial direction (A) that the closing element holding device is movable in the axial direction (A).

15. The poppet valve as claimed in claim 14, wherein the closing element comprises a distance piece, which projects beyond the closing element holding device toward the catcher in the axial direction (A), and in that the closing element and the catcher are arranged so as to match one another in such a way that the maximum movement of the closing element in the axial direction (A) is limited by the catcher.

* * * * *